(12) United States Patent
de Jong

(10) Patent No.: US 7,402,014 B2
(45) Date of Patent: Jul. 22, 2008

(54) STACKING DEVICE FOR TRANSPORTATION PALLETS

(75) Inventor: Leen-Pieter de Jong, Varsseveld (NL)

(73) Assignee: NEDCON Magazijninrichtung B.V., Doetinchem (NL)

( * ) Notice: Subject to any disclaimer, the term of this patent is extended or adjusted under 35 U.S.C. 154(b) by 0 days.

(21) Appl. No.: 11/686,411

(22) Filed: Mar. 15, 2007

(65) Prior Publication Data
US 2007/0215563 A1    Sep. 20, 2007

(30) Foreign Application Priority Data
Mar. 15, 2006  (DE)  ........................ 10 2006 011 851

(51) Int. Cl.
*B60P 7/08*  (2006.01)
(52) U.S. Cl. .......................... 410/32; 410/31
(58) Field of Classification Search .................. 410/31, 410/32, 34, 35, 46; 414/788.1, 923, 928, 414/929; 211/41.15, 168, 49.1
See application file for complete search history.

(56) References Cited
U.S. PATENT DOCUMENTS
5,755,816 A     5/1998   Schirmer et al.
6,270,299 B1 *  8/2001   Rehbein ...................... 410/41
6,817,828 B2   11/2004   Worrel et al.

FOREIGN PATENT DOCUMENTS
EP     1557382 A1    7/2005
WO  2005118441 A1   12/2005

OTHER PUBLICATIONS

Hilderbrandt, S.: Feinmechanische Bauteile, Carl Hanser Verlag, München 1972, p. 682.

* cited by examiner

*Primary Examiner*—Stephen Gordon
(74) *Attorney, Agent, or Firm*—Gudrun E. Huckett

(57) ABSTRACT

A device for stacking empty transportation pallets has a frame and a pallet receptacle rotatably supported on the frame and pivotable between a loading position and a removal position. An active locking element and a passive locking element are provided for effecting a releasable locking action for locking the pallet receptacle in the loading position and the removal position, respectively. The active locking element that is actuated for releasing the locking action is arranged on the pivotable pallet receptacle so as to be pivotable together with the pallet receptacle. The passive locking element is in a fixed position relative to the frame.

18 Claims, 5 Drawing Sheets

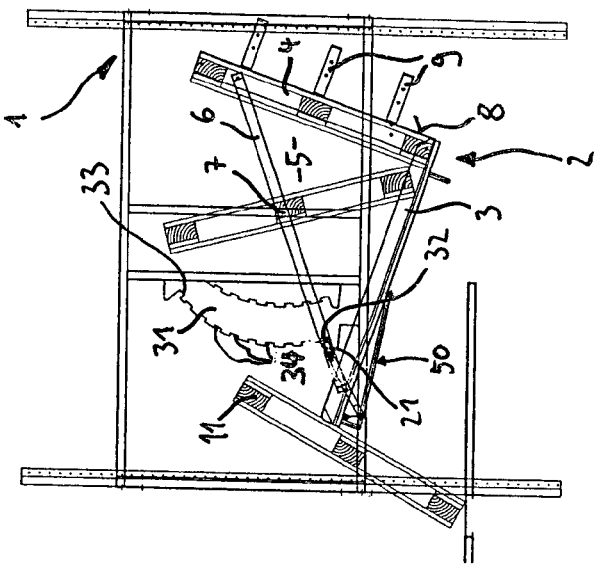
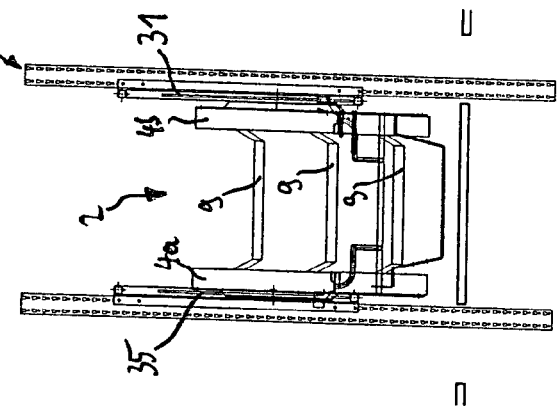
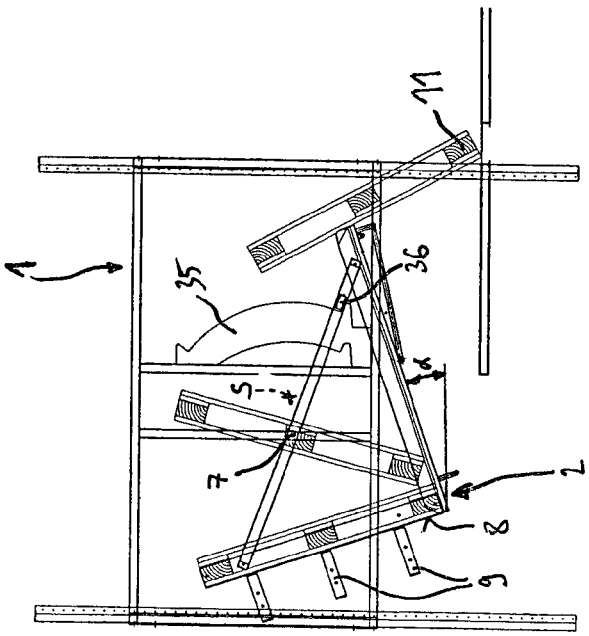

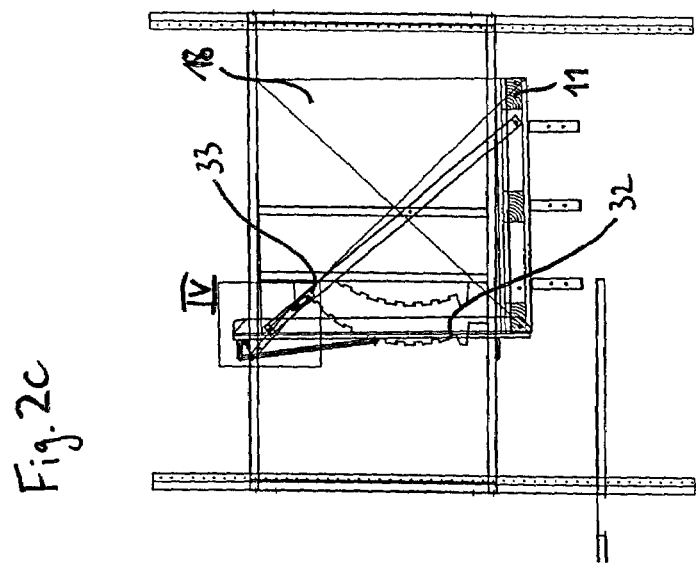
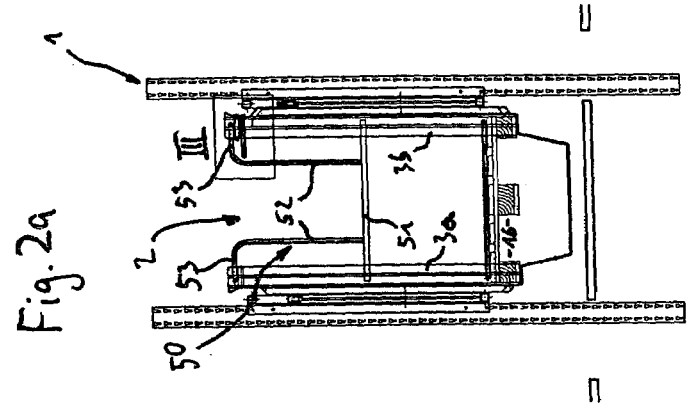
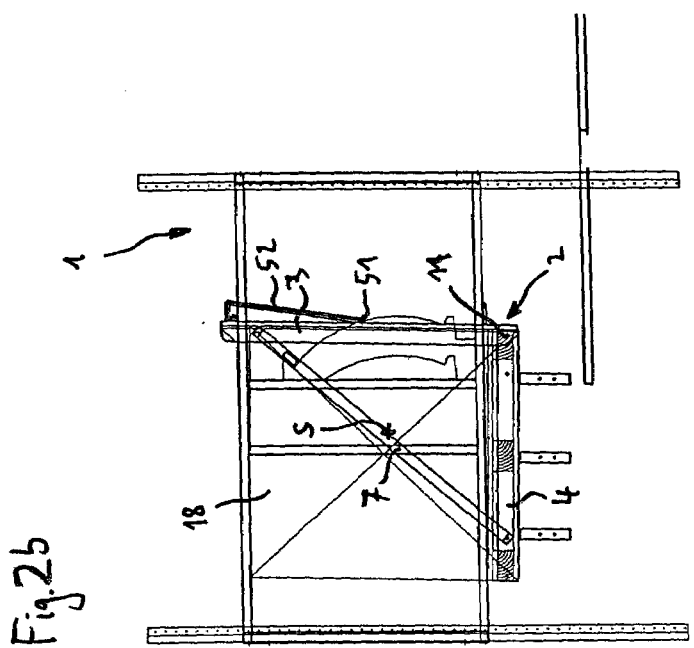

STACKING DEVICE FOR TRANSPORTATION PALLETS

BACKGROUND OF THE INVENTION

The invention relates to a device for stacking empty transportation pallets. The device comprises a pallet receptacle that is rotatably supported on a frame and is pivotable between a loading position and a removal position. The device further comprises active and passive locking elements for releaseably locking the pallet receptacle in the loading position and the removal position, respectively. One locking element is pivotable together with the pallet receptacle and another locking element is stationary relative to the frame.

In warehouse and order picking technology, transportation pallets are frequently used as a warehouse auxiliary for almost any type of goods or picked orders of goods. Especially the standardized "Euro pallets" are widely used. After emptying the transportation pallets, the empty pallets are stacked to pallet stacks, transported away, and then loaded again with goods or picked orders of goods. Almost always, the stacking of pallets to pallet stacks is done manually. This is heavy physical labor for the warehouse (storage facility) workers because the pallets have a significant weight and because it is necessary for forming the pallet stack to first lift the entire weight of the individual pallet to the level of the already formed stack and then place the pallet on the stack.

U.S. Pat. No. 6,817,828 B2 discloses a device for stacking pallets with which the heavy physical labor of the warehouse worker is reduced. The device has a pallet receptacle that is comprised of two legs and can be pivoted between a loading position and a removal a position. In the loading position, a warehouse worker can move the pallets with comparatively minimal force expenditure laterally into the pallet receptacle. Subsequently, the pallet receptacle, including the pallets collected therein, can be pivoted into the removal position. In the removal position, the pallets stacked to a stack can be removed by a warehouse operating device.

For loading the pallet receptacle as well as for removing pallets from the pallet receptacle, it is necessary to lock the pallet receptacle in regard to unwanted pivot movements. The known device has for this purpose two locking mechanisms: one for the loading position and another for the removal position. The locking mechanism for the loading position is arranged on the loading side and the locking mechanism for the removal position is arranged on the opposite removal side of the device. Both locking mechanisms are comprised each of a locking element that is pivotable together with pallet receptacle and a matching locking element that is stationary. As a pivotable locking element a bolt is provided on a leg of the pallet receptacle, respectively. Locking of the bolt is realized by means of a stationarily arranged pawl mechanism. For releasing the locking action, an actuating lever is provided. The actuating lever is arranged on the loading side of the device at some distance from the pallet receptacle and has separate cable pulls for the two pawl mechanisms by means of which the movement of the actuating lever is transmitted onto the pawls so that their locking action at the bolt is released. The cable pull for the pawl mechanism at the removal side is deflected about a plurality of deflection rollers and in this way guided onto the other side of the device.

In such a device the high constructive expenditure has been found to be a disadvantage. A further disadvantage of the device according to U.S. Pat. No. 6,817,828 B2 is that, as soon as the operator actuates the actuating lever, the pallet receptacle filled with the pallet stack and therefore having a significant total weight begins automatically to pivot in the direction toward the other end position. At this point in time, the operator has at least one hand on the actuating lever so that it is not possible for him to slow or stop the pivoting action, for example, in emergency situations.

SUMMARY OF THE INVENTION

It is an object of the present invention to provide a device for stacking empty transportation pallets that is characterized by a constructively simple locking device and that enables the operator to slow or stop an already initiated pivoting action e.g. in emergency situations.

In accordance with the present invention, this is achieved in that the active locking element that is actuatable for releasing the locking device is arranged on the pivotable pallet receptacle.

The arrangement of this active, i.e., actuatable, locking element at the pallet receptacle enables a simple configuration of the device. It is not necessary to provide cable pulls or deflection rollers. Also, when releasing the locking device the operator can keep his hands on the pallet receptacle and in this way can manually control the pivot movement and can slow it, if needed.

An advantageous embodiment provides that the active locking element has a catch element that is loaded by a spring and is lockable at the stationary locking element. Spring-loaded locking elements of this kind enable in a simple way a locking action relative to corresponding locking elements. By engagement of the catch element at the locking element a positive locking action is provided that can be released only by overcoming the force of the spring.

A further embodiment provides that the stationary passive locking element has at least a first locking structure and a second locking structure. When the active locking element locks at the second locking structure, a pivot angle of the pallet receptacle results that corresponds to the removal position; the pallet receptacle is in its loading position when the locking action is realized at the first locking structure.

Advantageous is an embodiment in which intermediate locking structures are provided between the first locking structure and the second locking structure; these intermediate locking structures can also be brought into engagement with the active locking element so that the pallet receptacle can be locked in more than two different positions. This is particularly advantageous when the warehouse worker wants to stop the movement of the pallet receptacle e.g. in an emergency situation.

Advantageously, the locking device that is comprised of the locking elements can be released by means of an actuating element that is coupled to the active locking element. Thus, the operator must not initiate the release of the locking device by means of the active locking element itself but can effect the release by means of a suitable actuating element that, for example, is characterized by improved gripping comfort, improved accessibility etc.

A further embodiment of the actuating element in regard to a constructively simple device provides that the actuating element has a grip part that is coupled to the pivotable active locking element. By means of the grip part a force can be exerted onto the locking element that is coupled e.g. by means of a pulling element to the grip part so that the force releases the locking action of the locking device on the stationary passive locking element, for example, by overcoming the force of a pressure spring. Such a grip part improves the handling comfort of the device.

In this connection, it is furthermore advantageous with regard to handling comfort when the grip part can be gripped together with a transverse rod that is attached rigidly on the pallet receptacle and when, moreover, the grip part can be pulled by pressure applied by fingers of one hand against the transverse rod. In this way, overall a simple handling of the device results: the actuating element can be actuated similar to the operation of a bicycle brake.

For a simple handling it is advantageous when the pallet receptacle is pivotable about an axle that is mounted fixedly on the frame and extends parallel to the centroidal axis (axis of the gravity center) of the pallet receptacle loaded with the pallet stack. By means of the essentially parallel displaced arrangement of the axis of rotation to the axis of the gravity center it is thus possible to pivot the pallet receptacle that is loaded with a complete pallet stack with minimal force expenditure into the removal position. When the centroidal axis (axis of gravity center) in both end positions is located between the operator and the axis of rotation, unwanted pivot movements are avoided, i.e., the pallet receptacle does not begin to pivot automatically; the pallet receptacle will pivot only when the operator exerts at least a certain amount of force onto the pallet receptacle.

A further embodiment provides that the pallet receptacle is comprised of a first leg against which the transportation pallets rest with their narrow side and a second leg that is positioned at a right angle thereto against which the lowermost transportation pallet of a pallet stack of several transportation pallet rests flat. By means of a pallet receptacle comprised of two such legs stacking of pallets can be accomplished in a particularly force-efficient way. For this purpose, in a first step the individual pallets are first positioned such that they are supported with a first edge on the ground and with a second edge on the first leg of the pallet receptacle. Subsequently, the worker grips the edge of the pallet that is still resting on the ground, lifts the edge of the pallet, and at the same time moves by a pivot movement the pallet into the pallet receptacle. When carrying out this movement, the pallet pivots about its edge supported already on the first leg of the pallet receptacle. As a result of this pivot movement, the worker must not lift the entire weight of the respective pallet but only approximately one half of its weight. Moreover, an alignment of the pallet is not required because one edge is already supported on the first leg of the pallet receptacle and therefore it is already in a uniquely defined position that is exactly aligned relative to the other pallets. At the end of the loading process, the pallet, slightly slanted, will come to rest against the second leg of the pallet receptacle or, when already a first pallet is positioned thereon, will come to rest against this first and thus lowermost pallet of the pallet stack being formed.

For improving the mechanical stability of the pallet receptacle, according to another embodiment it is proposed that the first and second legs are connected to one another by a connecting element and the axle is supported on the connecting element. The connecting element serves for reinforcing the legs that are positioned at a right angle to one another. At the same time, it serves for receiving or supporting the pivot axle.

A further embodiment provides a transverse rod arranged on the first leg by means of which the pivot force required for pivoting the pallet receptacle can be applied by the operator so that handling of the device is simplified.

An embodiment that saves parts and is thus advantageous with regard to construction of the device provides that the active and passive elements of the locking device are arranged only on one side of the pallet receptacle.

In regard to a simple configuration of the device it is moreover proposed that the active locking element is arranged either in the area of the first leg or in the area of the second leg or in the area of an intermediate space that is delimited between the two legs and is provided for receiving the transportation pallets, wherein in the remaining areas no further locking elements are arranged, respectively. In this embodiment, it is in particular not required to provide locking elements at the loading side as well as at the removal side that is facing away from the operator and is difficult to access. Instead, for the locking action in the loading position as well as in the removal position a single locking mechanism is sufficient. More than one active locking element is not required; this results in an overall simple construction of the device.

An embodiment in which the pivotable locking element is arranged in the area between the first leg and the axle has been found to be especially advantageous. This area is close to the operator who is pivoting the pallet receptacle. For actuating the locking element only short distances must be overcome between operator and locking mechanism, and this provides for a less complex configuration of the device.

Finally, according to another configuration it is proposed that the passive locking element is arranged on the frame. Such an arrangement is particularly advantageous for movable frames, as, for example, disclosed in EP 1 557 382 A1. Aside from such an arrangement, other stationary arrangements, for example, by screwing the passive locking element to the ground of the warehouse etc. are also conceivable.

BRIEF DESCRIPTION OF THE DRAWING

FIGS. 1a to 1c show different views of the device according to the invention in the loading position.

FIGS. 2a to 2c show different views of the device according to FIGS. 1a to 1c in the removal position.

FIG. 3 is a detail view of the detail III of FIG. 2a.

DESCRIPTION OF THE PREFERRED EMBODIMENTS

Figure 3:
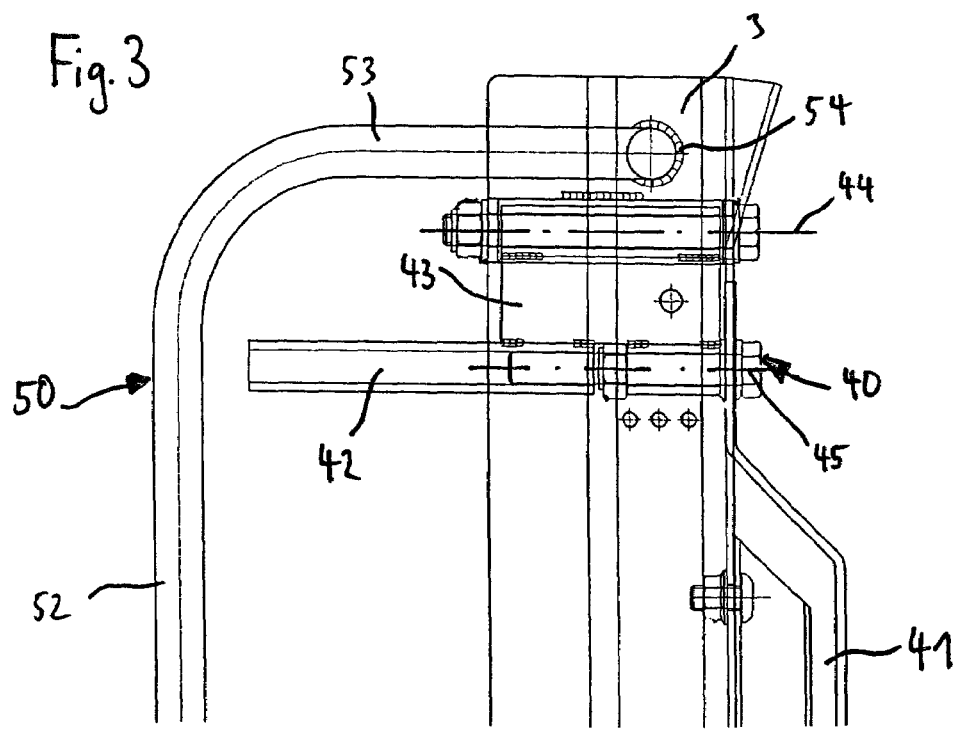

The configuration of a device according to the invention will be explained first with the aid of FIGS. 1a to 1c. FIG. 1a shows a front view, FIG. 1c a side view of the right side relative to FIG. 1a, and FIG. 1b a side view of the left side of the device relative to FIG. 1a.

The device is comprised primarily of a frame 1 and a pallet receptacle 2 pivotably arranged on the frame 1. The frame 1 of the illustrated embodiment is a stationary frame module that can be integrated into different warehouse shelf systems. The invention however is not limited to such frames but is also suitable for movable frames as disclosed, for example, in EP 1 557 382 A2. The pallet receptacle 2 is comprised of a first leg 3 and a second leg 4 that are positioned at a right angle relative to one another and delimit between them an intermediate space for receiving the pallets 11, for example, so-called Euro pallets. The legs 3, 4 are rigidly connected to one another in the area where they meet and moreover are reinforced by a connecting element 6. Approximately at the center of the connecting element 6, there is an axle 7 by means of which the pallet receptacle 2 as a whole is pivotably suspended on the frame 1. Once the pallet receptacle 2 in the loading position is completely filled with pallets 11 the common centroidal axis S of the pallet receptacle 2 filled with the pallet stack 18 is located between the axle 7 and the operator.

In the FIGS. 1a to 1c, the pallet receptacle 2 is in its first end position i.e., in the loading position. In this end position, the first leg 3 has a minimal slant at a slant angle α relative to the horizontal. The slant angle α is preferably between 5 degrees and 15 degrees. In the illustrated embodiment the bottom side 8 of the second leg 4 is provided with three braces 9 that connect the left beam 4a of the leg 4 to the right beam 4b and reinforce the pallet receptacle 2 in this way.

On the first leg 3 a grip 50 with a transverse rod 53 (compare FIG. 3) is provided; the operator can grip this grip 50 for pivoting the pallet receptacle 2. Moreover, the illustration of FIG. 1c shows a stationary looking element 31. In the illustrated embodiment, the locking element 31 is shaped like a circular ring segment. At its lower end it is provided with a first looking structure 32 for locking the pallet receptacle 2 in the illustrated loading position; at the upper end it is provided with a second locking structure 33 for locking the pallet receptacle 2 in the removal position. Between the first locking structure 32 and the second looking structure 33, the stationary looking element 31 has moreover several intermediate locking structures 34 whose function will be explained later on in more detail. The stationary locking element 31 is stationarily mounted on the frame 1, for example, by welding or screwing and forms the passive part of the locking device. It is located laterally on the pallet receptacle 2; only the right side of the device illustrated in FIG. 1a is provided with the stationary locking element 31. On the opposite side, to the left, there is a stop element 35 whose outer geometry is similar to that of the locking element 31. However, the stop element 35 is not provided with locking structures 32, 33, 34. The stop element 35 is not provided for locking purposes. Instead, the function of the stop element 35, in cooperation with the stop element 36 provided on the pallet receptacle 2, is to limit the pivot movement of the pallet receptacle 2 in both directions like a terminal stop so that the dissipation of forces in the end positions is realized symmetrically on both sides of the pallet receptacle 2. It is conceivable also to provide a second locking mechanism but a one-sided locking action, i.e., a locking action by means of a single locking mechanism on only one side of the pivotable pallet receptacle 2, has been found to save parts.

FIGS. 2a to 2c show the pallet receptacle 2 in its second end position, i.e., in the removal position. In this end position, the pallet receptacle 2 is filled with a plurality of pallets 11 forming a pallet stack 18 that is only schematically illustrated in FIGS. 2a to 2c. The lowermost pallet 11 rests flat against the second leg 4 of the pallet receptacle 2 and the other pallets are positioned with one of their narrow sides against the first leg 3. In this position, the axis of gravity center of the pallet receptacle 2 loaded with a pallet stack 18 extends also parallel to the pivot axle 7 and is located on the operator's side of the pivot axle 7, compare FIG. 2b. In this position, the pallet stack 18 can be removed by a forklift or a similar warehouse operating device from the pallet receptacle 2; for this purpose the second leg 4 is provided with an outwardly open removal opening 16 (FIG. 2a) between its beams 4a, 4b; for example, the fork of a forklift can access the removal opening 16 and engage from below the lowermost pallet for unloading the pallet receptacle 2.

FIG. 2a clearly shows the design of the grip 50. It is comprised of a transverse rod 51 connecting the two beams 3a, 3b of the first leg 3 and adjoining rods 52 bent several times whose lower end is welded to the transverse rod 51, respectively. The upper ends of the rods 52 have grip parts or transverse rods 53 that are bent outwardly several times.

Figure 4:
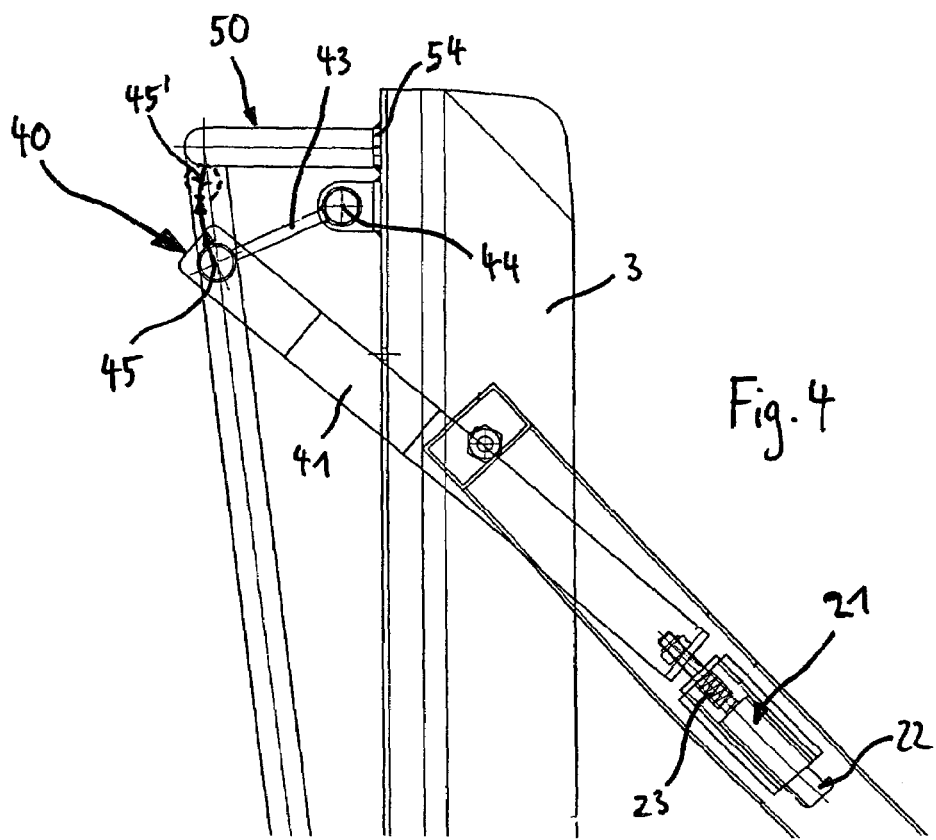
FIG. 4 is a detail view of the detail IV of FIG. 2c.

Details of the grip 50 as well as of the pivotable locking element 21 can be seen in FIGS. 3 and 4 showing detail views of the details indicated in FIGS. 2a and 2c. FIG. 3 shows in the left area the rod 52 of the grip 50; the rod 52 is essentially vertical in the removal position of the device. The upper end area of the rod 52 is bent outwardly at an angle of approximately 90 degrees to form transverse rod 53. At the outwardly facing end of the transverse rod 53 forming the grip part there is a further angled portion that, as shown in particular FIG. 4, is bent in the direction toward the first leg 3 and is connected by means of a welding seam 54 to the leg 3. For pivoting the pallet receptacle 2, the operator grips the transverse rods 53 arranged symmetrically on both sides of the pallet receptacle 2 and can thereby apply the pivoting force required for pivoting the pallet receptacle 2.

However, in order to able to pivot the pallet receptacle 2 out of one of the end positions, it is first required that the actively operating looking element 21 is actuated in order to release the locking action relative to the stationary locking element 31. For this purpose, the device is provided with an actuating element 40; details of the element 40 are illustrated in FIG. 4. The actuating element 40 is arranged in the area of the first leg 3 near the locking element 21 so that overall a simple configuration of the device results. It is comprised of a pulling element 41 that is coupled to a catch element 22 loaded by spring 23. At the upper end of the pulling element 41 a grip part 42 (compare FIG. 3) is provided which is connected by means of a stay 43 to the hinge 44 embodied as a double hinge 44, 45. In FIG. 3, the arrangement of the grip part 42 of the actuating element 40 as well as of the grip part 53 of the grip 50 can be seen. Both grip parts 42, 53 are essentially parallel to one another; the operator can therefore hold on to the pallet receptacle 2 by gripping the grip part 53 like a handlebar of a bicycle and the actuating element 40 can be actuated by means of the grip part 42 like a bicycle brake. For this purpose, the operator places the palm of his hand on the grip part 53 and engages the grip part 42 of the actuating element 40 by the fingers of his right hand. By pulling the grip part 42 toward the grip part 53, the axis of rotation of hinge 45 will reach the position 45' illustrated in FIG. 4 directly below the grip part 53. In this position, the two grip parts 53, 42 are close to one another so that the operator can grip both simultaneously and the pallet receptacle 2 is pivoted from one of the end positions easily in the direction of the other end position. At the end of the pivot action, the operator will release the engagement of both grip parts 42 and 53 so that the pulling element 41 is returned by the force of the pressure spring 23 into its initial position and the bolt 22 of the active locking element 21 engages again a corresponding locking structure 32, 33 of the stationary passive locking element 31.

If in an emergency situation it should be necessary to interrupt the pivot action, it is possible for the operator at any time to release the engagement across both parallel grip parts 42 and 53 so that the bolt 22 of the spring-loaded locking element 21 springs back into its lower position and a locking action relative to the next available intermediate locking structure 34 is realized. The passive locking element 31 is provided for this purpose with a plurality of intermediate locking structures 34 so that a locking action is possible, for example, at pivot intervals of the pallet receptacle 2 of 5 degrees, i.e., the spacing between the intermediate locking structures 34 is 5 degrees, respectively. This increases the safety of the device.

In the illustrated embodiment, the active locking element 21 is arranged in the area for receiving the pallet stack 18, which area is delimited between the two legs 3, 4 of the pallet receptacle 2, between the first leg 3 and the axle 7. In addition, an arrangement on the first leg or the second leg is possible also. For the locking action, an active locking element 21 arranged in one of these areas has been found to be functionally sufficient so that additional active locking elements 21 are not required.

Subsequently, based on FIGS. 5 to 12 the individual method steps for stacking several transport pallets 11 to form a pallet stack 18 will be explained.

Figure 5:
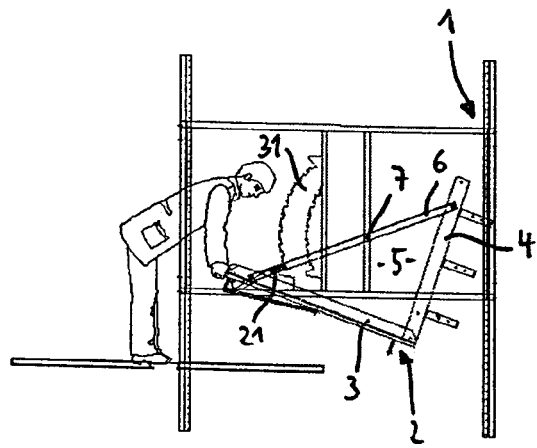
FIGS. 5 to 12 show different stages when handing transportation pallets with the aid of the device according to the invention in views from the side.

In FIG. 5 a warehouse worker is illustrated who has just pivoted the pallet receptacle 2 into its loading position and has locked it in the loading position by means of looking elements 21 and 31. The bolt 22 of the pivotable locking element 21 engages in this position the lower locking structure 32 of the locking element 31.

Figure 6:
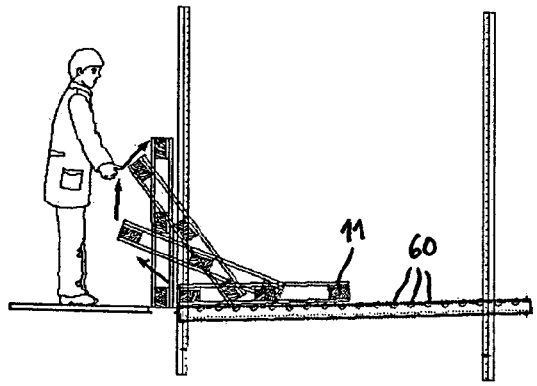
Figure 7:
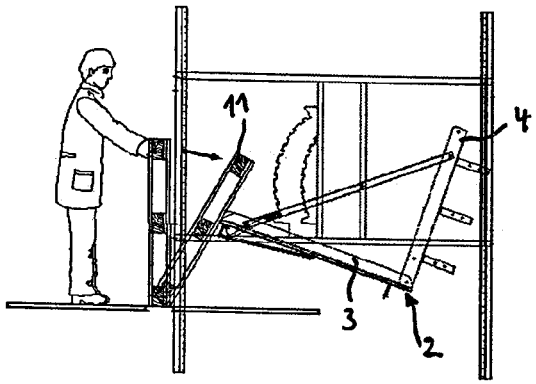
Figure 8:
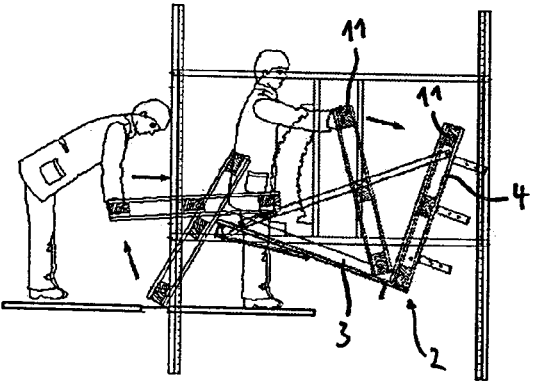
Figure 9:
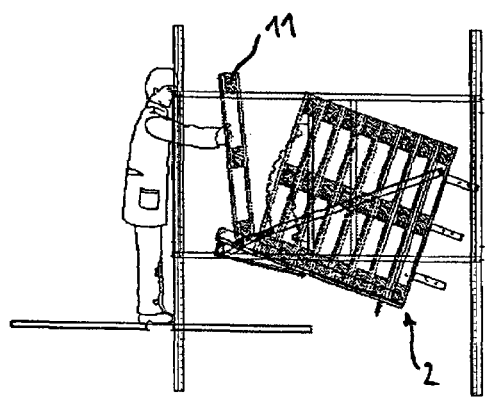

FIG. 6 shows the warehouse worker as he retrieves a transportation pallet 11; he grips the forward end of the pallet 11, wherein the worker first grips one end of the pallet 11 lying flat on a plane formed by the rollers 60 and lifts it into an upright position by a combined pulling and lifting movement in order to move it subsequently to the stacking device according to the invention. FIG. 7 illustrates the method step of loading the device with several transportation pallets 11, for example, relatively heavy "Euro pallets". The pallet 11 is placed with its leading edge on the outer edge of the first leg 3 while the rear edge of the pallet 11 is still resting on the ground. The pallet 11 can be brought into this position in a relatively force-efficient way. Subsequently, the pallet 11 is lifted at its rear edge (compare FIG. 8) and is moved into the pallet receptacle 2 by a pivot movement. When doing so, the pallet 11 pivots about its forward edge that is already resting on the leg 3 of the pallet receptacle 2. FIG. 8 illustrates a stage in which the lower pallet 11 is already lying flat on the second leg 4. A further pallet 11 is illustrated to the left in an intermediate position shortly before it comes to rest flat on the pallet 11 underneath. In this loading stage, the pallet receptacle 2 is secured by the locking elements 21, 31 in its position until the pallet receptacle 2 is loaded completely with a pallet stack 18 and thus assumes a stable position as a result of the gravity center axis S illustrated in FIG. 1b. In the illustrated embodiment a complete pallet stack 18 is comprised of a total of nine transportation pallets 11.

Figure 10:
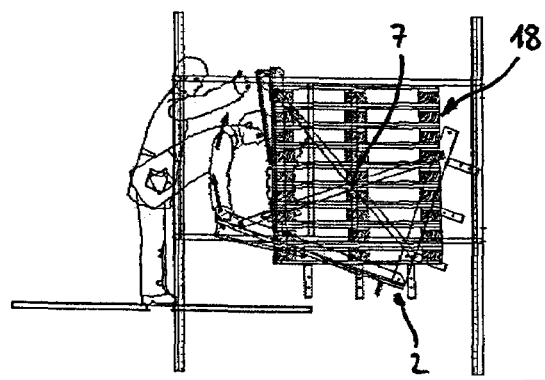
Figure 11:
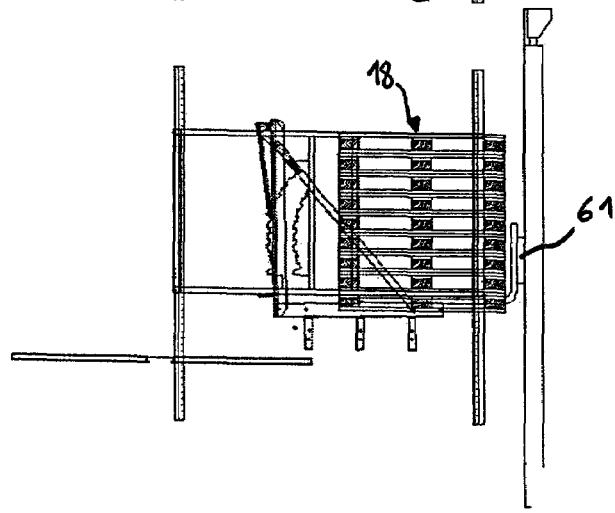
Figure 12:
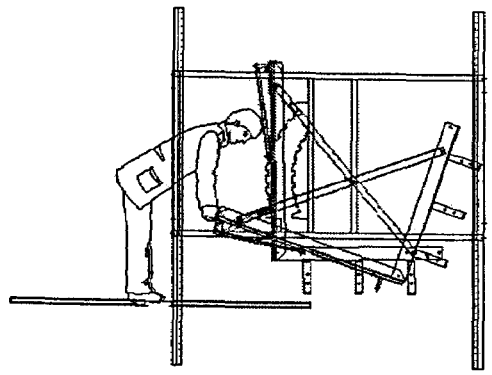

In the next step the warehouse worker grips according to the illustration of FIG. 10 the grip part 53 of the grip 50 in order to pivot the loaded pallet receptacle 2 about the pivot axle 7 into the removal position. Before pivoting, it is however required that the warehouse worker first releases the locking action of the locking elements 21, 31 by means of the actuating device 40; this has been explained in detail in connection with FIGS. 3 and 4. Subsequently, the worker can pivot the pallet receptacle 2 by application of a certain initial pivoting force into its removal position. In the removal position, the pallet stack 18 thus collected, after locking of the receptacle 2 in the removal position, can be removed by means of a warehouse operating device 61 illustrated in FIG. 11 in a greatly simplified way. After removal of the pallet stack 18, the warehouse worker grips the provided grip parts 53 of the pallet receptacle 2 again and unlocks by means of actuating element 40 the locking elements 21 and 31 in order to return the pallet receptacle 2 into the initial position illustrated in FIG. 5.

The specification incorporates by reference the entire disclosure of German priority document 10 2006 011 851.0 having a filing date of Mar. 15, 2006.

While specific embodiments of the invention have been shown and described in detail to illustrate the inventive principles, it will be understood that the invention may be embodied otherwise without departing from such principles.

What is claimed is:

1. A device for stacking empty transportation pallets, the device comprising:
   a frame;
   a pallet receptacle rotatably supported in the frame and pivotable between a loading position and a removal position;
   an active locking element and a passive locking element effecting a releasable locking action for locking the pallet receptacle in the loading position and the removal position, respectively;
   wherein the active locking element that is actuated for releasing the locking action is arranged on the pivotable pallet receptacle so as to be pivotable together with the pallet receptacle;
   wherein the passive locking element is in a fixed position relative to the frame.

2. The device according to claim 1, wherein the active looking element comprises a catch element loaded by a spring, wherein the catch element engages the passive locking element for effecting the locking action.

3. The device according to claim 1, wherein the passive locking element has at least first and second locking structures.

4. The device according to claim 3, wherein the passive locking element has intermediate locking structures between the first and second locking structures.

5. The device according to claim 1, further comprising an actuating element coupled to the active locking element, wherein the locking action provided by the active locking element and the passive locking element is releasable by the actuating element.

6. The device according to claim 5, wherein the actuating element comprises a grip part coupled to the active locking element.

7. The device according to claim 6, further comprising a transverse rod that is rigidly connected to the pallet receptacle, wherein the grip part and the transverse rod are arranged such that a worker is able to grip both the transverse rod and the grip part with one hand.

8. The device according to claim 7, wherein the grip part and the transverse rod are adapted to be pulled against one another by one hand of a worker.

9. The device according to claim 1, further comprising an axle mounted on the frame, wherein the pallet receptacle is pivotably mounted on the axle, wherein the axle is positioned parallel to an axis of a gravity center of the pallet receptacle when loaded with a pallet stack.

10. The device according to claim 1, wherein the pallet receptacle comprises a first leg and a second leg that is positioned at a right angle to the first leg, wherein transportation pallets when received in the pallet receptacle rest with a narrow side against the first leg, wherein a lowermost transportation pallet of a pallet stack of transportation pallets rests flat on the second leg.

11. The device according to claim 10, further comprising an axle mounted on the frame, wherein the pallet receptacle is pivotably mounted on the axle, wherein the axle is positioned parallel to an axis of a gravity center of the pallet receptacle when loaded with a pallet stack, wherein the pallet receptacle comprises a connecting element that connects the first and second legs to one another, wherein the axle is supported on the connecting element.

12. The device according to claim 10, comprising a transverse rod arranged on the first leg, wherein a worker applies a required pivoting force for pivoting the pallet receptacle to the transverse rod.

13. The device according to claim 10, wherein the active looking element is arranged in an area of the first leg, wherein no additional locking elements are arranged in the remaining areas of the pallet receptacle.

14. The device according to claim 10, wherein the active looking element is arranged in an area of the second leg, wherein no additional locking elements are arranged in the remaining areas of the pallet receptacle.

15. The device according to claim 10, wherein the active looking element is arranged in an area that is provided for receiving a pallet stack and is delimited between the first and second legs, wherein no additional locking elements are arranged in the remaining areas of the pallet receptacle.

16. The device according to claim 10, wherein the active locking element is arranged between the first leg and an axle on which axle the pallet receptacle pivots.

17. The device according to claim 1, wherein the passive locking element is arranged on the frame.

18. The device according to claim 1, wherein the active and passive locking elements are arranged on one side of the pallet receptacle.

* * * * *